United States Patent

Inoue (10) Patent No.: US 10,267,373 B2
(45) Date of Patent: Apr. 23, 2019

(54) CHARACTERISTIC VALUE VARIABLE DYNAMIC VIBRATION ABSORBER AND CHARACTERISTIC VALUE VARIABLE VIBRATION ISOLATOR

(71) Applicant: HONDA MOTOR CO., LTD., Tokyo (JP)

(72) Inventor: Toshio Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/416,196

(22) Filed: Jan. 26, 2017

(65) Prior Publication Data

US 2017/0219039 A1 Aug. 3, 2017

(30) Foreign Application Priority Data

Jan. 29, 2016 (JP) .................................. 2016-015453

(51) Int. Cl.
  *F16F 7/10* (2006.01)
  *F16F 7/108* (2006.01)
  (Continued)

(52) U.S. Cl.
  CPC ............ *F16F 7/1011* (2013.01); *F16F 7/108* (2013.01); *F16F 7/1028* (2013.01); *F16F 7/116* (2013.01);
  (Continued)

(58) Field of Classification Search
  CPC ........ F16F 7/1011; F16F 7/108; F16F 7/1028; F16F 15/002; F16F 2222/08; F16F 2222/06; F16F 2224/05; F16F 2224/025
  (Continued)

(56) References Cited

U.S. PATENT DOCUMENTS 5,427,362 A * 6/1995 Schilling ................ F16F 7/1011
  188/267
5,433,422 A * 7/1995 Ross ....................... F16F 7/108
  188/379

(Continued)

FOREIGN PATENT DOCUMENTS

JP         4-341631 A    11/1992
JP       2012-42022 A     3/2012
(Continued)

OTHER PUBLICATIONS

Office Action dated Sep. 26, 2017, issued in counterpart Japanese Application No. 2016-015453, with English machine translation. (6 pages).

(Continued)

*Primary Examiner* — Xuan Lan Nguyen
(74) *Attorney, Agent, or Firm* — Westerman, Hattori, Daniels & Adrian, LLP (57) ABSTRACT

To solve a problem, for example, in which holding a movable mass becomes difficult because the spring characteristics of a rubber constituting a basis are set low in order to set the characteristic value at a low value. In a first dynamic vibration absorber including a movable mass that is coupled to a vibration damping target member via an MRE as a first elastic member having elastic characteristics variable with a magnetic field, and being capable of varying a vibration characteristic value of the movable mass by controlling the magnetic field, the dynamic vibration absorber has a second elastic member different from the MRE, and the vibration damping target member and the movable mass are elastically-coupled to each other via the second elastic member.

6 Claims, 7 Drawing Sheets

(51) Int. Cl.
*F16F 15/00* (2006.01)
*F16F 7/116* (2006.01)

(52) U.S. Cl.
CPC ........ *F16F 15/002* (2013.01); *F16F 2222/06* (2013.01); *F16F 2222/08* (2013.01); *F16F 2224/025* (2013.01); *F16F 2224/0283* (2013.01)

(58) Field of Classification Search
USPC ...................................................... 188/267.2
See application file for complete search history.

(56) References Cited

U.S. PATENT DOCUMENTS

| | | | | |
|---|---|---|---|---|
| 5,984,233 | A * | 11/1999 | Snyder, Jr. | F16F 7/108 188/379 |
| 8,061,677 | B2 * | 11/2011 | Johnson | F16F 7/1011 248/550 |
| 2008/0191118 | A1 | 8/2008 | Johnson et al. | |
| 2008/0306332 | A1 * | 12/2008 | Choi | B06B 1/045 600/38 |
| 2011/0057367 | A1 * | 3/2011 | Hasegawa | F16F 7/1011 267/140.14 |
| 2011/0180980 | A1 * | 7/2011 | Urayama | F16F 7/1011 267/140.14 |
| 2013/0328254 | A1 * | 12/2013 | Kojima | B60K 5/1241 267/140.15 |

FOREIGN PATENT DOCUMENTS

| | | |
|---|---|---|
| JP | 2016-1008 A | 1/2016 |
| WO | 2012/026332 A1 | 3/2012 |

OTHER PUBLICATIONS

Office Action dated Feb. 11, 2019, issued in counterpart Chinese Application No. 201611027221.3, with English machine translation. (11 pages).

* cited by examiner

CHARACTERISTIC VALUE VARIABLE DYNAMIC VIBRATION ABSORBER AND CHARACTERISTIC VALUE VARIABLE VIBRATION ISOLATOR

CROSS REFERENCES TO RELATED APPLICATIONS

The present application claims priority under 35 U.S.C. § 119 to Japanese Patent Application No. 2016-015453, filed Jan. 29, 2016, entitled "characteristic value variable dynamic vibration absorber and characteristic value variable vibration isolator." The contents of this application are incorporated herein by reference in their entirety.

TECHNICAL FIELD

The present disclosure relates to a characteristic value variable dynamic vibration absorber and a characteristic value variable vibration isolator to restrain vibration of a vibrating body.

BACKGROUND

Heretofore, a dynamic damper (characteristic variable dynamic vibration absorber) has been widely used to reduce the vibration of a machine. This is a part composed of a spring and a mass having a characteristic frequency which is the same as the frequency of a vibration in question, and reduces the vibration in question by use of: vibrating with an opposite phase to the vibration in question; and the inertia force of the mass.

Here, the following relationship is satisfied:

$$f=\omega/2\pi=(1/2\pi)\sqrt{(K/M)},$$

where f denotes a characteristic frequency (natural frequency), ω denotes a characteristic value, K denotes a spring constant, and M denotes a mass.

A dynamic damper typically used vibrates with an opposite phase to that of an input vibration at a characteristic frequency f which is determined by the ratio between a movable mass N and a spring constant K, and uses the inertia force of the mass M in order to reduce the vibration. Hence, one dynamic damper needs to be used for one frequency in question. Further, in the case of using multiple dynamic dampers, if the characteristic frequencies f of these dynamic dampers are close to one another, they might interfere with each other and increase the vibration instead of reducing it.

Meanwhile, in the case of reducing a vibration noise which is a problem caused by the vibration of an engine, several frequencies in question sometimes exist due to variation of a frequency in question in synchronization with an engine speed.

Thus, in order to achieve a dynamic damper whose characteristic frequency f is variable, a dynamic damper using a magneto-rheological elastomer (MRE) as a spring is proposed (see International Patent Application Publication No. WO2012/026332, for example). This is a technique for varying the rigidity of a rubber, mixed with magnetic substances, by controlling the strength of a magnetic field generated by an electric current flowing through a coil.

SUMMARY

However, the structure of the variable dynamic damper using the MRE has the following problems especially when the damper is used in a low frequency area because the movable mass is relatively heavy and the spring holding the mass needs to be set to have low spring characteristics.

(a) Because the spring characteristics of a rubber constituting a basis of the MRE are set low in order to set the characteristic value at a low value, holding the movable mass becomes difficult. This makes the movable mass hang down by its own weight, causing an unusual noise due to interference or the like.

(b) The temperature of the MRE is increased by heat generation from the coil and the environment of the location where it is used, which further degrades the spring characteristics of the rubber being the basis of the MRE, causing a problem in terms of durability.

(c) Unevenness in characteristics among MREs caused during mass production process makes it difficult to manage the characteristics of these parts.

It is preferable to provide a characteristic value variable dynamic vibration absorber and a characteristic value variable vibration isolator capable of solving the above problems.

[1] A characteristic value variable dynamic vibration absorber according to a first aspect of the present disclosure is a characteristic value variable dynamic vibration absorber including: a vibration damping target member that vibrates; and a movable mass that is elastically-coupled to the vibration damping target member via a magneto-rheological elastomer as a first elastic member having elastic characteristics variable with a magnetic field, and being capable of varying a vibration characteristic value of the movable mass by controlling the magnetic field, the dynamic vibration absorber being characterized in that it has a second elastic member different from the magneto-rheological elastomer, and the vibration damping target member and the movable mass are elastically-coupled to each other via the second elastic member.

This makes it possible for the dynamic vibration absorber to restrain the movable mass from moving downward relative to its reference position due to gravity, and restrain upper and lower parts of the movable mass from becoming asymmetrical due to age deterioration of the elastic member, whereby the characteristic value variable dynamic vibration absorber can favorably exhibit its vibration damping characteristics.

[2] In the first aspect of the present disclosure, the dynamic vibration absorber may be configured such that the second elastic member is formed from a plate spring made of a magnetic substance material, the movable mass forms a closed magnetic path together with the first elastic member and the second elastic member, and the dynamic vibration absorber varies the vibration characteristic value of the movable mass by controlling the magnetic field in accordance with the vibration of the vibration damping target member.

The formation of the closed magnetic path with a magnetic substance material enables a magnetic field to act on the magneto-rheological elastomer efficiently, thereby achieving power-saving and efficient vibration damping characteristics.

[3] In this case, the plate spring may include multiple cutout portions that are arranged radially. This enables accurate transmission of a magnetic field in the magnetic path formed between the vibration damping target member or mounting members and the movable mass in the closed magnetic path.

[4] In the first aspect of the present disclosure, the dynamic vibration absorber may be configured such that it includes an electromagnet capable of controlling the magnetic field, and the electromagnet is elastically-coupled to both of the first elastic member and the second elastic member. Since the first elastic member and the second elastic member are elastically-coupled to the electromagnet directly, it is possible to form a closed magnetic path efficiently with a small number of components.

[5] A characteristic value variable dynamic vibration absorber according to a second aspect of the present disclosure is a characteristic value variable dynamic vibration absorber including: a vibration damping target member that vibrates; a mounting member that is coupled to the vibration damping target member; a first electromagnet and a second electromagnet that are equipped in the mounting member and configured to generate magnetic fields in opposite directions; and three or more multiple elastic members that elastically-couple the mounting member and the movable mass to each other, and being capable of varying a vibration characteristic value of the movable mass by controlling the magnetic field of the first electromagnet and/or the magnetic field of the second electromagnet in accordance with vibration of the vibration damping target member, the dynamic vibration absorber being characterized in that at least one of the multiple elastic members is formed from a magneto-rheological elastomer.

Since the elastic members elastically-coupled to the movable mass can be set symmetrically, it is possible to reduce a noise factor such as a difference in displacement between upper and lower (left and right) parts of the movable mass, thereby achieving efficient vibration damping characteristics.

[6] In the second aspect of the present disclosure, the dynamic vibration absorber may be configured such that at least one of the multiple elastic members is made of the magneto-rheological elastomer and the remaining multiple elastic members are formed from a plate spring made of a magnetic substance material, and the movable mass forms a first closed magnetic path together with the first electromagnet and forms a second closed magnetic path together with the second electromagnet.

Since the dynamic vibration absorber includes the multiple closed magnetic paths for controlling the magneto-rheological elastomer, a bundle of magnetic fields can act on the magneto-rheological elastomer, thereby achieving power-saving and efficient vibration damping characteristics. Moreover, since the dynamic vibration absorber includes the multiple closed magnetic paths for controlling the multiple magneto-rheological elastomers, the dynamic vibration absorber can be set to have appropriate elastic characteristics by controlling the strength of magnetic fields to act on these closed magnetic paths.

[7] In this case, the plate spring may include multiple cutout portions that are arranged radially. This enables accurate transmission of magnetic fields in the magnetic paths formed between the vibration damping target member or mounting members and the movable mass in the closed magnetic paths.

[8] In addition, the dynamic vibration absorber may be configured such that the first electromagnet and the second electromagnet are elastically-coupled to the multiple elastic members. Since the multiple elastic members are elastically-coupled to the first electromagnet and the second electromagnet directly, it is possible to form closed magnetic paths efficiently with a small number of components.

[9] A characteristic value variable vibration isolator according to a third aspect of the present disclosure is a characteristic value variable vibration isolator including: a first mounting member that is coupled to the vibration isolator on a side thereof close to a vibration source; a second mounting member that is coupled to the vibration isolator on a side thereof close to a vibration damping target member vibrating with the vibration source; and a first elastic member and a second elastic member that elastically-couple the first mounting member and the second mounting member to each other, the vibration isolator being characterized in that the first elastic member is made of a magneto-rheological elastomer having elastic characteristics variable with a magnetic field, and the second elastic member is an elastic member different from the magneto-rheological elastomer.

This makes it possible for the vibration isolator to restrain the movable mass from moving downward relative to its reference position due to gravity, and restrain upper and lower parts of the movable mass from becoming asymmetrical due to age deterioration of the elastic member, whereby the characteristic value variable vibration isolator can favorably exhibit its vibration damping characteristics.

[10] In the third aspect of the present disclosure, the vibration isolator may be configured such that the second elastic member is formed from a plate spring made of a magnetic substance material, the movable mass forms a closed magnetic path together with the first elastic member and the second elastic member, and the vibration isolator varies the vibration characteristic value of the movable mass by controlling the magnetic field in accordance with the vibration of the vibration source.

The formation of the closed magnetic path with a magnetic substance material enables a magnetic field to act on the magneto-rheological elastomer efficiently, thereby achieving power-saving and efficient vibration damping characteristics.

[11] In this case, the plate spring may include multiple cutout portions that are arranged radially. This enables accurate transmission of a magnetic field in the magnetic path formed between the vibration damping target member or mounting members and the movable mass in the closed magnetic path.

[12] In the third aspect of the present disclosure, the vibration isolator may be configured such that it includes an electromagnet capable of controlling the magnetic field, and the electromagnet is elastically-coupled to both of the first elastic member and the second elastic member. Since the first elastic member and the second elastic member are elastically-coupled to the electromagnet directly, it is possible to form a closed magnetic path efficiently with a small number of components.

For example, the following effects may be achieved by embodiments.

(1) Since one embodiment includes the second elastic member different from the MRE, the spring characteristics can be managed with the second elastic member.

(2) The effect (1) makes it easy to manage the characteristic value of the dynamic vibration absorber in a state where no magnetic field is applied, and makes small the variation in the characteristics of the dynamic vibration absorber due to temperature and the like.

(3) One embodiment exhibits very high durability performance in a minute oscillation range, which is helpful in restricting its displacement during large oscillation.

(4) It is possible to achieve, at low cost, a dynamic vibration absorber and a vibration isolator, in particular a characteristic value variable dynamic vibration absorber and a characteristic value variable vibration isolator whose characteristics are easy to manage and whose durability performance is high.

(5) Power-saving and efficient vibration damping characteristics can be achieved.

DETAILED DESCRIPTION

Hereinbelow, embodiments of a characteristic value variable dynamic vibration absorber and a characteristic value variable vibration isolator according to the present disclosure are described with reference to FIGS. 1A to 7.

Figure 1A:
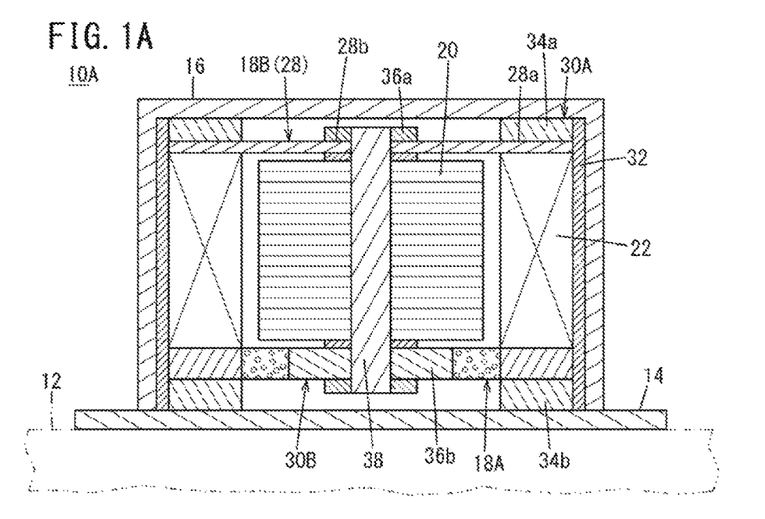
FIG. 1A is a vertical sectional view illustrating the configuration of a characteristic value variable dynamic vibration absorber according to a first embodiment of the present disclosure (first dynamic vibration absorber)

First, as illustrated in FIG. 1A, a characteristic value variable dynamic vibration absorber according to a first embodiment of the present disclosure (hereinafter stated as a "first dynamic vibration absorber 10A") has: a base 14 that is mounted on a vibration damping target member 12 (illustrated with a chain double-dashed line); a housing 16 that is installed on the base 14 and has a closed upper face; a first elastic member 18A that has elastic characteristics variable with a magnetic field; a second elastic member 18B that is made of a material different from that of the first elastic member 18A; a mass member 20 that is elastically-coupled to the vibration damping target member 12 via at least the first elastic member 18A and the second elastic member 18B; and an electromagnet 22 (exciting coil) that is configured to apply a magnetic field on the first elastic member 18A. Assuming the case of a vehicle, examples of the vibration damping target member 12 include: a subframe on which an engine as a vibration generation source is installed; a body main frame near an engine mount; and the like.

Figure 2A:
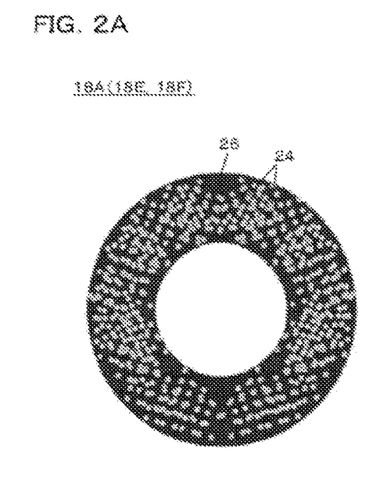
FIG. 2A is a plan view illustrating a first configuration example of a first elastic member (fifth elastic member, sixth elastic member) showing its upper face.
Figure 2B:
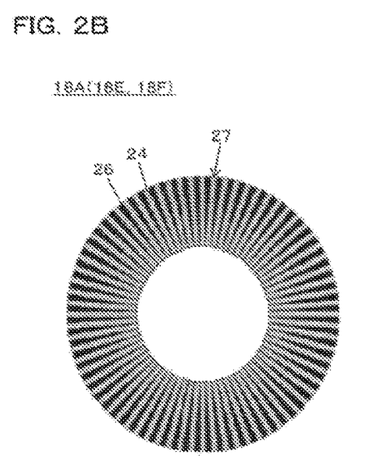
FIG. 2B is a plan view illustrating a second configuration example of the first elastic member (fifth elastic member, sixth elastic member) showing its upper face.

For example, the first elastic member 18A has a configuration such as one illustrated in FIG. 2A and one illustrated in FIG. 2B. Specifically, the first elastic member 18A illustrated in FIG. 2A is formed in an annular shape, has magnetic particles 24 inside, and is made of a magnetorheological elastomer (hereinafter stated as the MRE) whose elastic modulus is variable with the strength of a magnetic field to be applied thereon. The MRE has: an elastic material 26 that has the viscoelasticity of matrix (matrix elastomer); and the multiple conductive magnetic particles 24 that are dispersed inside the elastic material 26. The conductive magnetic particles 24 are dispersed inside the elastic material, and its elastic modulus varies with the strength of a magnetic field to be applied thereon. The first elastic member 18A illustrated in FIG. 2B has a configuration where multiple magnetic particle arrays 27, each made by aligning the magnetic particles 24 in a radial direction, are arranged radially inside the annular elastic material 26. Both of the configuration illustrated in FIG. 2A and the configuration illustrated in FIG. 2B can vary the apparent rigidity by the strength of a magnetic flux in the radial direction; however, the configuration as illustrated in FIG. 2B where the multiple magnetic particle arrays 27 are arranged radially has an advantage in that it can vary the elastic modulus with respect to the strength of the magnetic flux more efficiently.

Figure 2C:
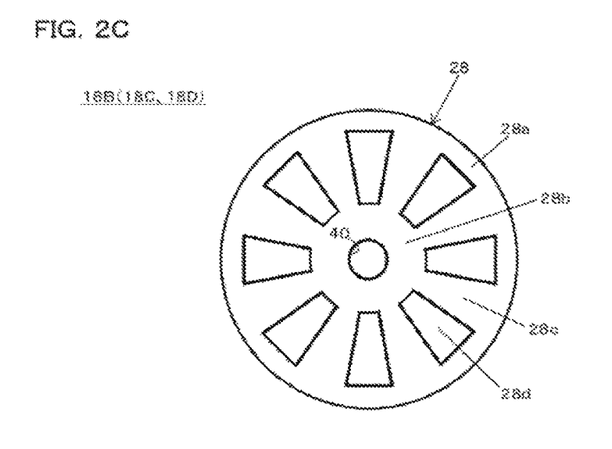
FIG. 2C is a plan view illustrating a second elastic member (third elastic member, fourth elastic member) showing its upper face.

For example, as illustrated in FIG. 2C, the second elastic member 18B is formed from a plate spring 28 made of a magnetic substance material, has a circular outer shape, and integrally has: an outer circumferential side annular portion 28a; an inner circumferential side annular portion 28b; and multiple beam portions 28c that are formed between the outer circumferential side annular portion 28a and the inner circumferential side annular portion 28b. In other words, the plate spring 28 has a configuration where multiple cutout portions 28d are arranged radially, for example.

In addition, as illustrated in FIG. 1A, the first dynamic vibration absorber 10A has: a first mounting member 30A for securing the electromagnet 22 on the inner wall of the housing 16; and a second mounting member 30B that is configured to swingably support the mass member 20 at the center of the housing 16.

The first mounting member 30A is made of a magnetic substance material, for example, and has: a tubular portion 32 that is placed between the inner circumferential face of the housing 16 and the outer circumferential face of the electromagnet 22; an upper annular portion 34a that is placed on an upper part of the electromagnet 22; and a lower annular portion 34b that is placed between the upper face of the base 14 and the lower face of the electromagnet 22. The outer circumferential face of the upper annular portion 34a and the outer circumferential face of the lower annular portion 34b are in contact with or formed integrally with the inner circumferential face of the tubular portion 32.

The second mounting member 30B is made of a magnetic substance material, for example, and has: a disk-shaped upper support plate 36a that supports the upper face of the mass member 20; a disk-shaped lower support plate 36b that supports the lower face of the mass member 20; and a spindle 38 that is secured in the space between the upper support plate 36a and the lower support plate 36b and made of a magnetic substance material penetrating the center of the mass member 20.

The first elastic member 18A is placed between the lower annular portion 34b of the first mounting member 30A and the lower support plate 36b of the second mounting member 30B.

The second elastic member 18B is placed above the mass member 20 in the housing 16. Specifically, the outer circumferential side annular portion 28a of the second elastic member 18B is secured in the space between the upper face of the electromagnet 22 and the lower face of the upper annular portion 34a of the first mounting member 30A, and the inner circumferential side annular portion 28b of the second elastic member 18B is secured by the upper support plate 36a of the second mounting member 30B. The spindle 38 of the second mounting member 30B is inserted in a central hole 40 (see FIG. 2C) of the second elastic member 18B.

Figure 1B:
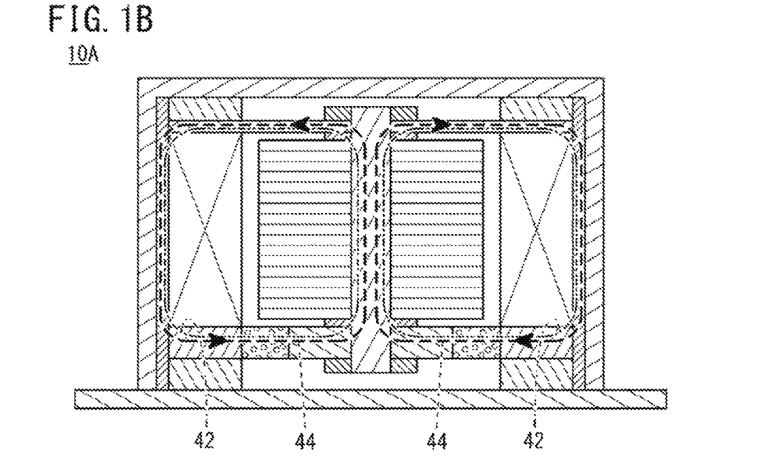
FIG. 1B is an explanatory diagram illustrating the operation of the first dynamic vibration absorber.

A winding constituting the electromagnet 22 is wound along the circumferential direction of the mass member 20. In addition, as described previously, the first mounting member 30A, the second mounting member 30B, and the second elastic member 18B are made of a magnetic substance material. That is to say, as illustrated in FIG. 1B, in the first dynamic vibration absorber 10A, a closed magnetic path 42 is formed by the first mounting member 30A, the first elastic member 18A, the second mounting member 30B, and the second elastic member 18B. In other words, the first dynamic vibration absorber has a configuration where the first elastic member 18A is disposed in the closed magnetic path 42. Accordingly, when a positive drive current is flowed through the winding of the electromagnet 22, for example, magnetic lines of force 44 directed from an outer circumferential portion to an inner circumferential portion of the first elastic member 18A are formed around the electromagnet 22 as illustrated in FIG. 1B. Likewise, although not illustrated, when a negative drive current is flowed through the winding of the electromagnet 22, magnetic lines of force directed from the inner circumferential portion to the outer circumferential portion of the first elastic member 18A are formed around the electromagnet 22. The strength of a magnetic field varies with the drive current flowed through the winding, and the strength of a magnetic field to be generated increases as the drive current increases.

Once a magnetic field is applied on the first elastic member 18A by energizing the winding of the electromagnet 22, the magnetic particles 24 are polarized in accordance with the strength of the magnetic field, and magnetic coupling is formed. The elastic modulus of the first elastic member 18A becomes larger than the elastic modulus (rigidity) of the elastic material 26 (matrix elastomer) itself by causing the magnetic particles 24 to be coupled to one another in a chained fashion and foam a mesh structure, for example. The stronger the magnetic field applied on the first elastic member 18A is, the larger the magnetic coupling among the magnetic particles 24 becomes, and the larger the elastic modulus of the first elastic member 18A becomes. Accordingly, the larger the drive current fed to the winding is, the larger the elastic modulus of the first elastic member 18A becomes, and the less likely the first elastic member 18A is to be deformed against a load.

Figure 3:
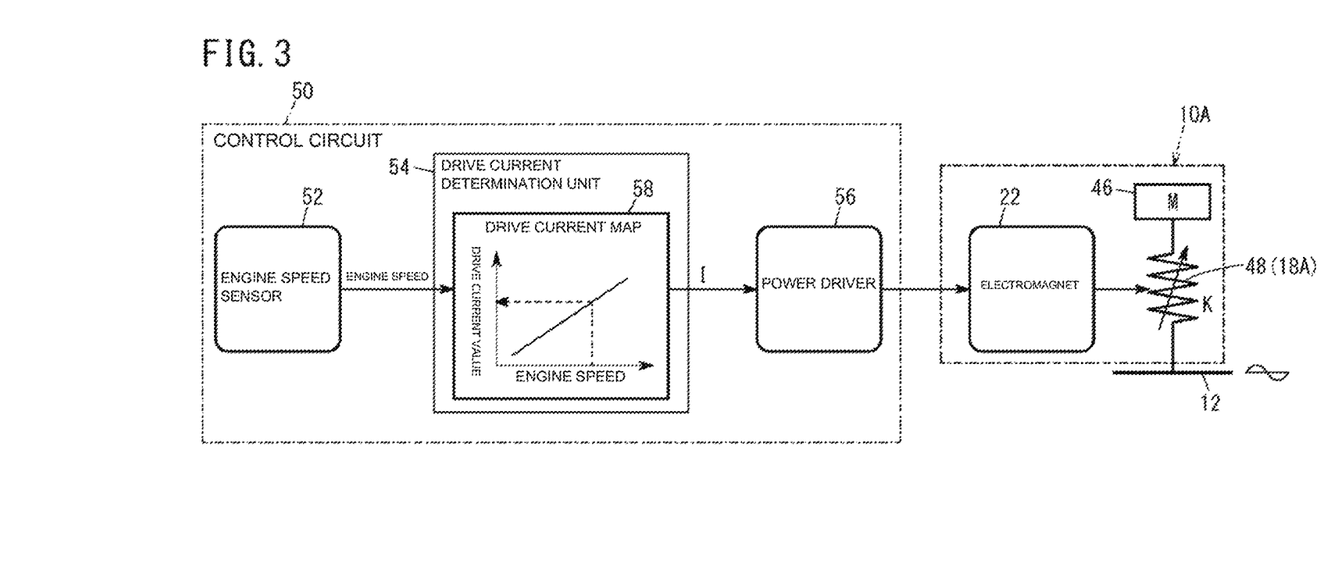
FIG. 3 is a block diagram illustrating an example of a control operation of the first dynamic vibration absorber.

As schematically illustrated in FIG. 3, the first dynamic vibration absorber 10A has a configuration where a movable mass 46 is connected to the top of the vibration damping target member 12 through a spring 48. The movable mass 46 corresponds to the mass member 20 and the second mounting member 30B illustrated in FIG. 1A, and forms the closed magnetic path 42 (see FIG. 1B) with the first elastic member 18A and the second elastic member 18B. The spring 48 corresponds to the first elastic member 18A.

A resonant frequency f (characteristic value ω) of the first dynamic vibration absorber 10A formed from the movable mass 46 and the spring 48 in FIG. 3 is:

$$f=(1/2\pi)\sqrt{(K/M)},$$

where M denotes the mass of the movable mass 46 and K denotes the spring constant of the spring 48.

Due to its structure, the first dynamic vibration absorber 10A reduces the vibration of the vibration damping target member 12 by vibrating with an opposite phase to that of the vibration frequency of the vibration damping target member 12 and using the inertia force of the movable mass 46. In particular, since the elastic modulus of the first elastic member 18A varies by the formation of a magnetic field as described previously, it is possible to set the resonant frequency f of the first dynamic vibration absorber 10A equal to the vibration frequency of the vibration damping target member 12 even if the vibration frequency varies.

Here, an example of a control operation of the first dynamic vibration absorber 10A is described with reference to FIGS. 1A, 1B, and 3.

As illustrated in FIG. 3, the first dynamic vibration absorber 10A has a control circuit 50 in addition to the above configuration. The control circuit 50 has: an engine speed sensor 52 that is installed in a rotary machine of the vehicle; a drive current determination unit 54; and a power driver 56. The drive current determination unit 54 is configured to determine a drive current value I based on an output (engine speed) from the engine speed sensor 52 and with reference to a drive current map 58 in which the relationship between the engine speed and the drive current value is defined in advance.

The drive current value I thus determined is fed to the electromagnet 22 via the power driver 56. Thereby, the first dynamic vibration absorber 10A vibrates with an opposite phase to that of the main vibration frequency f of the vibration damping target member 12. As a result, the vibration of the vibration damping target member 12 can be reduced. Specifically, the first dynamic vibration absorber varies the vibration characteristic value of the movable mass 46 by controlling a magnetic field, generated by the electromagnet 22, in accordance with the vibration of the vibration damping target member 12.

Dynamic vibration absorbers using MRE typically have the following problems especially when they are used in a low frequency area because the movable mass 46 is relatively heavy and the spring 48 holding the movable mass 46 needs to be set to have a low spring constant K.

(a) Because the spring characteristics of the elastic material 26 constituting a basis of the MRE are set low in order to set the characteristic value at a low value, holding the movable mass 46 becomes difficult. This makes the movable mass 46 hang down by its own weight, causing an unusual noise due to interference or the like.

(b) The temperature of the MRE is increased by heat generation from the electromagnet 22 and the environment of the location where it is used, which further degrades the spring characteristics of the elastic material 26 being the basis of the MRE, causing a problem in terms of durability.

(c) Unevenness in characteristics among MREs caused during mass production process makes it difficult to manage the characteristics of these parts.

On the other hand, the first dynamic vibration absorber 10A employs, as the structure of supporting the movable mass 46, the structure using both of the first elastic member 18A made of the MRE and the second elastic member 18B formed from the plate spring 28 made of a magnetic substance material, instead of an existing structure using only an MRE. This brings about the following effects.

(1) Since the second elastic member 18B is formed from the plate spring 28 made of a magnetic substance material, the spring characteristics can be managed with the thickness of the plate spring 28.

(2) The effect (1) makes it easy to manage the characteristic value of the first dynamic vibration absorber 10A in a state where no magnetic field is applied, and makes small the variation in the characteristics of the dynamic vibration absorber due to temperature and the like.

(3) The dynamic vibration absorber exhibits very high durability performance in a minute oscillation range, which is helpful in restricting its displacement during large oscillation.

(4) By employing the structure where the second elastic member 18B (plate spring 28) made of a magnetic substance material is used and the first elastic member 18A is disposed in the closed magnetic path 42, it is possible to achieve, at low cost, a dynamic vibration absorber, in particular a characteristic value variable dynamic vibration absorber whose characteristics are easy to manage and whose durability performance is high.

(5) The formation of the closed magnetic path 42 with a magnetic substance material enables a magnetic field to act on the first elastic member 18A (MRE) efficiently, thereby achieving power-saving and efficient vibration damping characteristics.

(6) Since the plate spring 28 has the configuration where the multiple cutout portions 28d (see FIG. 2C) are arranged radially, accurate transmission of a magnetic field is possible in the magnetic path 42 formed between the first mounting member 30A secured on the vibration damping target member 12 and the second mounting member 30B on which the movable mass 46 is mounted.

(7) Since the electromagnet 22 is elastically-coupled to both of the first elastic member 18A and the second elastic member 18B, it is possible to form a closed magnetic path efficiently with a small number of components.

Next, a dynamic vibration absorber according to a second embodiment of the present disclosure (hereinafter stated as a "second dynamic vibration absorber 10B") is described with reference to FIGS. 4A and 4B.

Figure 4A:
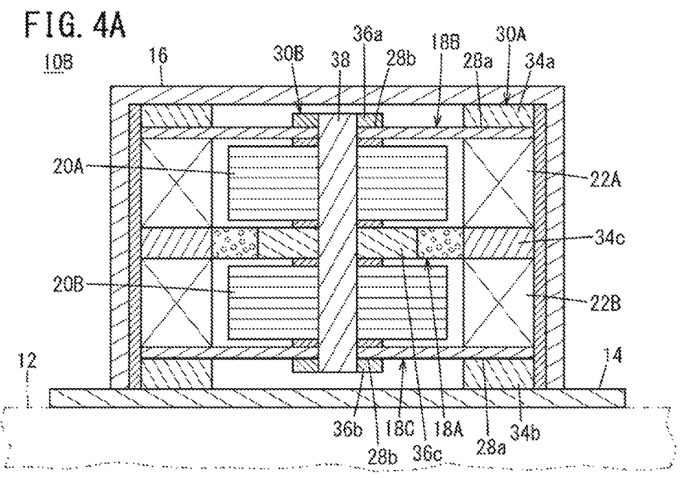
FIG. 4A is a vertical sectional view illustrating the configuration of a characteristic value variable dynamic vibration absorber according to a second embodiment of the present disclosure (second dynamic vibration absorber)

As illustrated in FIG. 4A, the second dynamic vibration absorber 10B has almost the same configuration as the first dynamic vibration absorber 10A described above, but is different in that it has: two mass members (a first mass member 20A and a second mass member 20B); three elastic members (the first elastic member 18A, the second elastic member 18B, and a third elastic member 18C); and two electromagnets (a first electromagnet 22A and a second electromagnet 22B).

The first mounting member 30A has a central annular portion 34c in addition to the upper annular portion 34a and the lower annular portion 34b. The second mounting member 30B also has a central support plate 36c in addition to the upper support plate 36a and the lower support plate 36b.

The first mass member 20A is secured in the space between the upper support plate 36a and the central support plate 36c of the second mounting member 30B, and the second mass member 20B is secured in the space between the lower support plate 36b and the central support plate 36c of the second mounting member 30B. The first electromagnet 22A is secured on the first mounting member 30A at a position opposed to the first mass member 20A, i.e., in the space between the upper annular portion 34a and the central annular portion 34c, and the second electromagnet 22B is secured on the first mounting member at a position opposed to the second mass member 20B, i.e., in the space between the lower annular portion 34b and the central annular portion 34c.

The first elastic member 18A (MRE) is placed between the central annular portion 34c of the first mounting member 30A and the central support plate 36c of the second mounting member 30B.

The second elastic member 18B (plate spring 28) is placed above the first mass member 20A in the housing 16. Specifically, the outer circumferential side annular portion 28a (see FIG. 2C) of the second elastic member 18B is pinched by the upper face of the first electromagnet 22A and the lower face of the upper annular portion 34a of the first mounting member 30A, and the inner circumferential side annular portion 28b of the second elastic member 18B is secured on the upper support plate 36a of the second mounting member 30B. The spindle 38 of the second mounting member 30B is inserted, at its upper end part, in the central hole 40 of the second elastic member 18B.

The third elastic member 18C is formed from the plate spring 28 (see FIG. 2C) made of a magnetic substance material as in the second elastic member 18B, and is placed below the second mass member 20B in the housing 16. Specifically, the outer circumferential side annular portion 28a (see FIG. 2C) of the third elastic member 18C is secured in the space between the lower face of the second electromagnet 22B and the upper face of the lower annular portion 34b of the first mounting member 30A, and the inner circumferential side annular portion 28b (see FIG. 2C) of the third elastic member 18C is secured on the lower support plate 36b of the second mounting member 30B. The spindle 38 of the second mounting member 30B is inserted, at its lower end part, in the central hole 40 of the third elastic member 18C.

In the second dynamic vibration absorber 10B, the first mass member 20A, the second mass member 20B, and the second mounting member 30B constitute the movable mass 46 (see FIG. 3). Thus, the first elastic member 18A made of the MRE is elastically-coupled to a central part of the movable mass 46, the second elastic member 18B formed from the plate spring 28 is elastically-coupled to an upper part of the movable mass 46, and the third elastic member 18C also formed from the plate spring 28 is elastically-coupled to a lower part of the movable mass 46.

To put it differently, the elastic members elastically-coupled to the movable mass 46 can be placed symmetrically. Thus, when the spindle 38 of the second mounting member 30B extends in the vertical direction, it is possible to reduce a noise factor such as a difference in displacement between upper and lower parts of the movable mass 46. Meanwhile, when the spindle 38 of the second mounting member 30B extends in the direction orthogonal to the vertical direction, it is possible to reduce a noise factor such as a difference in displacement between left and right parts of the movable mass 46. This makes it possible to remove or simplify circuits and arithmetic processing for reducing these noise factors, and thereby achieve efficient vibration damping characteristics.

A winding constituting the first electromagnet 22A is wound along the circumferential direction of the first mass member 20A, and a winding constituting the second electromagnet 22B is wound along the circumferential direction of the second mass member 20B. In addition, as described previously, the first mounting member 30A, the second mounting member 30B, and the second elastic member 18B are made of a magnetic substance material. That is to say, as illustrated in FIG. 4B, in the second dynamic vibration absorber 10B, a first closed magnetic path 42A is formed by an upper part of the first mounting member 30A, the first elastic member 18A, an upper part of the second mounting member 30B, and the second elastic member 18B, and a second closed magnetic path 42B is formed by a lower part of the first mounting member 30A, the first elastic member 18A, a lower part of the second mounting member 30B, and the third elastic member 18C. In other words, the second dynamic vibration absorber has a configuration where the first elastic member 18A (MRE) is disposed in the first closed magnetic path 42A and the second closed magnetic path 42B.

Figure 4B:
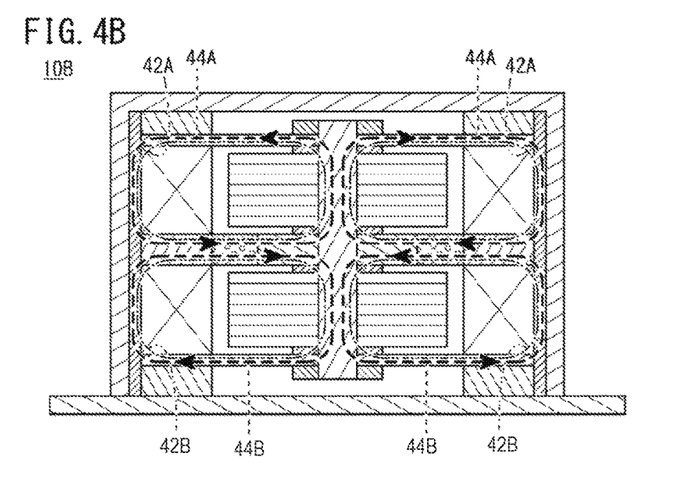
FIG. 4B is an explanatory diagram illustrating the operation of the second dynamic vibration absorber.

Accordingly, when a positive drive current is flowed through the windings of the first electromagnet 22A and the second electromagnet 22B, for example, magnetic fields in opposite directions are generated from the first electromagnet 22A and the second electromagnet 22B as illustrated in FIG. 4B. Specifically, first magnetic lines of force 44A directed from an outer circumferential portion to an inner circumferential portion of the first elastic member 18A are formed around the first electromagnet 22A, and second magnetic lines of force 44B also directed from the outer circumferential portion to the inner circumferential portion of the first elastic member 18A are formed around the second electromagnet 22B. In this case, in the first elastic member 18A, multiple magnetic lines of force pass through the first elastic member 18A by the combination of the first magnetic lines of force 44A formed by the first electromagnet 22A and the second magnetic lines of force 44B faulted by the second electromagnet 22B, and thus the strength of the magnetic field applied on the first elastic member 18A is increased. In addition, the strength of the magnetic field varies with the drive currents flowed through the winding of the first electromagnet 22A and the winding of the second electromagnet 22B, and the strength of a magnetic field to be generated increases as the drive currents increase.

Likewise, although not illustrated, when a negative drive current is flowed through the windings of the first electromagnet 22A and the second electromagnet 22B, the first magnetic lines of force 44A directed from the inner circumferential portion to the outer circumferential portion of the first elastic member 18A are formed around the first electromagnet 22A, and the second magnetic lines of force 44B also directed from the inner circumferential portion to the outer circumferential portion of the first elastic member 18A are formed around the second electromagnet 22B. In this case also, the multiple magnetic lines of force pass through the first elastic member 18A, and thus the strength of a magnetic field applied on the first elastic member 18A is increased.

In this way, the second dynamic vibration absorber 10B also brings about the effects (1) to (7) described above. Moreover, since the dynamic vibration absorber includes the multiple closed magnetic paths for controlling the first elastic member 18A, a bundle of magnetic fields can act on the first elastic member 18A, thereby achieving power-saving and efficient vibration damping characteristics.

Next, a dynamic vibration absorber according to a third embodiment of the present disclosure (hereinafter stated as a "third dynamic vibration absorber 10C") is described with reference to FIGS. 5A and 5B.

Figure 5A:
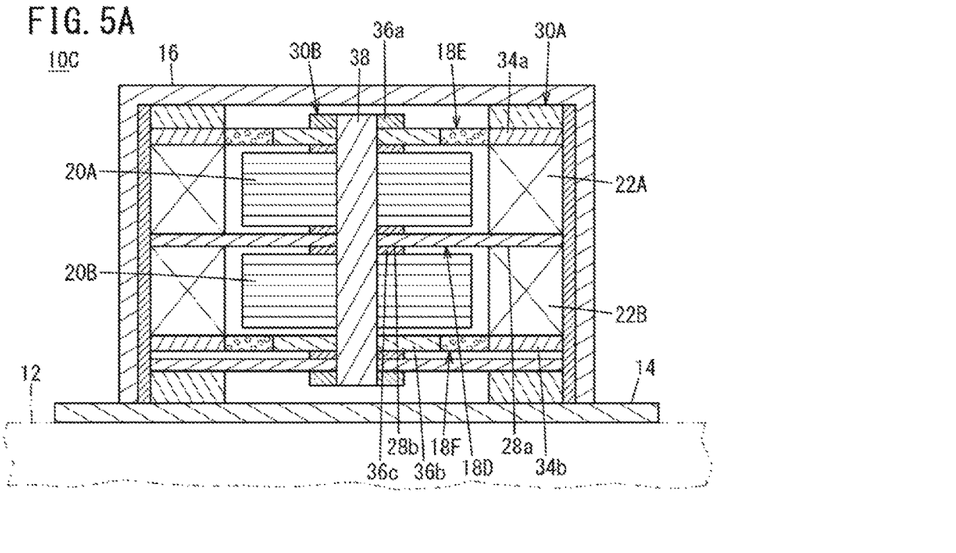
FIG. 5A is a vertical sectional view illustrating the configuration of a characteristic value variable dynamic vibration absorber according to a third embodiment of the present disclosure (third dynamic vibration absorber)

As illustrated in FIG. 5A, the third dynamic vibration absorber 10C has almost the same configuration as the second dynamic vibration absorber 10B described above, but is different in the following points.

Specifically, a fourth elastic member 18D formed from the plate spring 28 (see FIG. 2C) made of a magnetic substance is elastically-coupled to a central part of the movable mass 46 formed from the first mass member 20A, the second mass member 20B, and the second mounting member 30B, a fifth elastic member 18E made of the MRE is elastically-coupled to an upper part of the movable mass 46, and a sixth elastic member 18F also made of the MRE is elastically-coupled to a lower part of the movable mass 46.

Specifically, the outer circumferential side annular portion 28a (see FIG. 2C) of the fourth elastic member 18D (plate spring 28) is secured in the space between the lower face of the first electromagnet 22A and the upper face of the second electromagnet 22B, and the inner circumferential side annular portion 28b of the fourth elastic member 18D is secured on the central support plate 36c of the second mounting member 30B. The spindle 38 of the second mounting member 30B is inserted, at its central part, in the central hole 40 (see FIG. 2C) of the fourth elastic member 18D.

The fifth elastic member 18E (MRE) is placed between the upper annular portion 34a of the first mounting member 30A and the upper support plate 36a of the second mounting member 30B.

The sixth elastic member 18F (MRE) is placed between the lower annular portion 34b of the first mounting member 30A and the lower support plate 36b of the second mounting member 30B.

The third dynamic vibration absorber 10C also brings about the effects (1) to (7) described above. Moreover, the elastic members elastically-coupled to the movable mass 46 can be placed symmetrically. Thus, when the spindle 38 of the second mounting member 30B extends in the vertical direction, it is possible to reduce a noise factor such as a difference in displacement between the upper and lower parts of the movable mass 46. Meanwhile, when the spindle 38 of the second mounting member 30B extends in the direction orthogonal to the vertical direction, it is possible to reduce a noise factor such as a difference in displacement between the left and right parts of the movable mass 46. This makes it possible to remove or simplify circuits and arithmetic processing for reducing these noise factors, and thereby achieve efficient vibration damping characteristics.

Figure 5B:
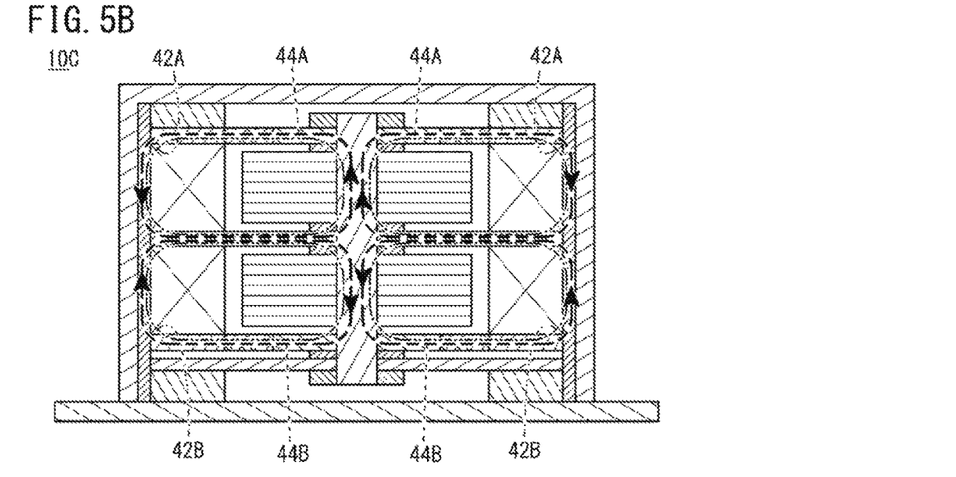
FIG. 5B is an explanatory diagram illustrating the operation of the third dynamic vibration absorber.

In addition, as illustrated in FIG. 5B, in the third dynamic vibration absorber 10C, the first closed magnetic path 42A is formed by the upper part of the first mounting member 30A, the fourth elastic member 18D, the upper part of the second mounting member 30B, and the fifth elastic member 18E, and the second closed magnetic path 42B is formed by the lower part of the first mounting member 30A, the fourth elastic member 18D, the lower part of the second mounting member 30B, and the sixth elastic member 18F. In other words, the third dynamic vibration absorber has a configuration where the fifth elastic member 18E (MRE) is disposed in the first closed magnetic path 42A and the sixth elastic member 18F (MRE) is disposed in the second closed magnetic path 42B.

Accordingly, when a positive drive current is flowed through the windings of the first electromagnet 22A and the second electromagnet 22B, for example, the first magnetic lines of force 44A directed from the inner circumferential portion to the outer circumferential portion of the fifth elastic member 18E (MRE) are formed around the first electromagnet 22A, and the second magnetic lines of force 44B also directed from the inner circumferential portion to the outer circumferential portion of the sixth elastic member 18F (MRE) are formed around the second electromagnet 22B.

Likewise, although not illustrated, when a negative drive current is flowed through the windings of the first electromagnet 22A and the second electromagnet 22B, the first magnetic lines of force 44A directed from the outer circumferential portion to the inner circumferential portion of the fifth elastic member 18E are formed around the first electromagnet 22A, and the second magnetic lines of force 44B also directed from the outer circumferential portion to the inner circumferential portion of the sixth elastic member 18F are formed around the second electromagnet 22B.

In this way, since the third dynamic vibration absorber includes the multiple closed magnetic paths (the first closed magnetic path 42A and the second closed magnetic path 42B) for controlling the multiple elastic members made of the MRE (the fifth elastic member 18E and the sixth elastic member 18F), the dynamic vibration absorber can be set to have appropriate elastic characteristics by controlling the strength of magnetic fields to act on these closed magnetic paths.

Next, a dynamic vibration absorber according to a fourth embodiment of the present disclosure (hereinafter stated as a "fourth dynamic vibration absorber 10D") is described with reference to FIG. 6.

Figure 6:
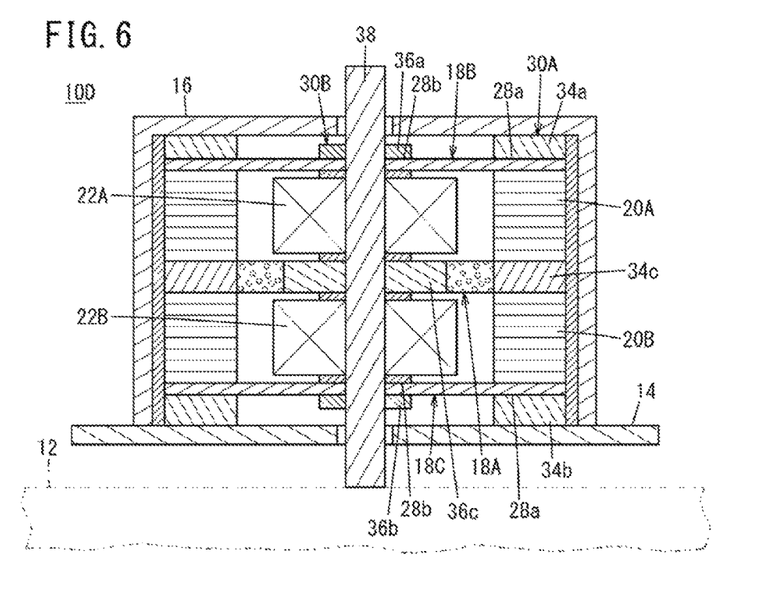
FIG. 6 is a vertical sectional view illustrating the configuration of a characteristic value variable dynamic vibration absorber according to a fourth embodiment of the present disclosure (fourth dynamic vibration absorber).

As illustrated in FIG. 6, the fourth dynamic vibration absorber 10D has almost the same configuration as the second dynamic vibration absorber 10B described above, but is different in the following point.

Specifically, the spindle 38 of the second mounting member 30B penetrates an upper part of the housing 16 and the base 14, i.e., is riot restricted by the housing 16 and the base 14.

In addition, the first mass member 20A is secured on the upper inner wall of the first mounting member 30A, and the second mass member 20B is secured on the lower inner wall of the first mounting member 30A. The first electromagnet 22A is secured in the space between the upper support plate 36a and the central support plate 36c of the second mounting member 30B, and the second electromagnet 22B is secured in the space between the lower support plate 36b and the central support plate 36c of the second mounting member 30B. In other words, the fourth dynamic vibration absorber 10D has a structure where the first electromagnet 22A and the second electromagnet 22B exist on the inner side of the first mass member 20A and the second mass member 20B.

The first elastic member 18A (MRE) is placed between the central annular portion 34c of the first mounting member 30A and the central support plate 36c of the second mounting member 30B.

The outer circumferential side annular portion 28a (see FIG. 2C) of the second elastic member 18B (plate spring 28) is pinched by the upper face of the first mass member 20A and the lower face of the upper annular portion 34a of the first mounting member 30A, and the inner circumferential side annular portion 28b of the second elastic member 18B is secured on the upper support plate 36a of the second mounting member 30B.

The outer circumferential side annular portion 28a (see FIG. 2C) of the third elastic member 18C (plate spring 28) is secured in the space between the lower face of the second mass member 20B and the upper face of the lower annular portion 34b of the first mounting member 30A, and the inner circumferential side annular portion 28b of the third elastic member 18C is secured on the lower support plate 36b of the second mounting member 30B. Accordingly, the first mass member 20A, the second mass member 20B, and the vibration damping target member 12 constitute the movable mass 46 (see FIG. 3) of the fourth dynamic vibration absorber 10D.

As in the second dynamic vibration absorber 10B, the fourth dynamic vibration absorber 10D also brings about the effects (1) to (7) described above. Moreover, since the dynamic vibration absorber includes the multiple closed magnetic paths for controlling the first elastic member 18A, a bundle of magnetic fields can act on the first elastic member 18A, thereby achieving power-saving and efficient vibration damping characteristics.

Figure 7:
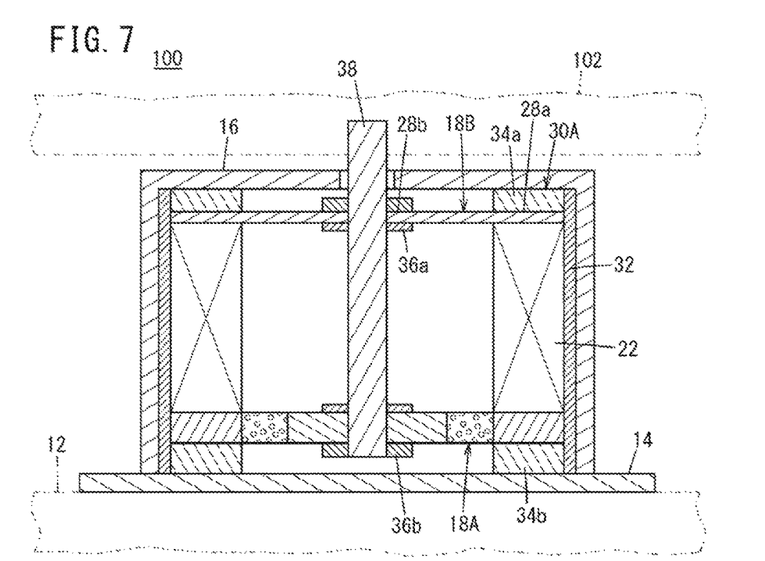
FIG. 7 is a vertical sectional view illustrating the configuration of a characteristic value variable vibration isolator according to an embodiment of the present disclosure.

Next, a vibration isolator 100 according to an embodiment of the present disclosure is described with reference to FIG. 7.

The vibration isolator 100 has a configuration similar to the first dynamic vibration absorber 10A described above, but is different in the following points.

Specifically, the first mounting member 30A placed on the inner wall of the housing 16 and the vibration damping target member 12 (illustrated with a chain double-dashed line) are coupled to each other with the base 14 interposed therebetween. The spindle 38 of the second mounting member 30B penetrates the housing 16, and a vibration source 102 (illustrated with a chain double-dashed line) is coupled to an upper part of the spindle 38 that penetrates an upper part of the housing 16. In addition, no mass member is secured on the second mounting member 30B. To put it simply, the vibration isolator has a structure with no mass member. Accordingly, the vibration damping target member 12 constitutes the movable mass of the vibration isolator 100. An engine is one of examples of the vibration source 102, and a subframe is one of examples of the vibration damping target member 12.

The vibration isolator 100 also reduces the vibration of the vibration damping target member 12 by vibrating with an opposite phase to that of the vibration frequency of the vibration source 102. As described previously, since the elastic modulus of the first elastic member 18A varies by the formation of a magnetic field, it is possible to set the resonant frequency f of the vibration isolator 100 equal to the vibration frequency of the vibration source 102 even if the vibration frequency varies.

In particular, since the second elastic member 18B formed from the plate spring 28 made of a magnetic substance is installed in addition to the first elastic member 18A made of the MRE, it is possible to restrain the movable mass from moving downward relative to its reference position due to gravity, and restrain upper and lower parts of the movable mass from becoming asymmetrical due to age deterioration of the first elastic member 18A. Thereby, the vibration isolator 100 can favorably exhibit its vibration damping characteristics.

[Summary of Embodiments]

As has been described, the dynamic vibration absorber according to the above embodiment is a characteristic value variable dynamic vibration absorber including: the vibration damping target member 12 that vibrates; and the movable mass 46 that is elastically-coupled to the vibration damping target member 12 via the MRE as the first elastic member 18A having elastic characteristics variable with a magnetic field, and being capable of varying a vibration characteristic value of the movable mass 46 by controlling the magnetic field, the dynamic vibration absorber being characterized in that it has the second elastic member 18B different from the MRE, and the vibration damping target member 12 and the movable mass 46 are elastically-coupled to each other via the second elastic member 18B.

In this embodiment, the dynamic vibration absorber may be configured such that the second elastic member 18B is formed from the plate spring 28 made of a magnetic substance material, the movable mass 46 forms the closed magnetic path 42 together with the first elastic member 18A and the second elastic member 18B, and the dynamic vibration absorber varies the vibration characteristic value of the movable mass 46 by controlling the magnetic field in accordance with the vibration of the vibration damping target member 12. In this case, the plate spring 28 may include the multiple cutout portions 28d that are arranged radially.

In this embodiment, the dynamic vibration absorber may be configured such that it includes the electromagnet 22 capable of controlling the magnetic field, and the electromagnet 22 is elastically-coupled to both of the first elastic member 18A and the second elastic member 18B.

Meanwhile, the dynamic vibration absorber according to the embodiment is a characteristic value variable dynamic vibration absorber including: the vibration damping target member 12 that vibrates; the first mounting member 30A that is coupled to the vibration damping target member 12; the first electromagnet 22A and the second electromagnet 22B that are equipped in the first mounting member 30A and configured to generate magnetic fields in opposite directions; and the three or more multiple elastic members that elastically-couple the first mounting member 30A and the movable mass 46 to each other, and being capable of varying a vibration characteristic value of the movable mass 46 by controlling the magnetic field of the first electromagnet 22A and/or the magnetic field of the second electromagnet 22B in accordance with the vibration of the vibration damping target member 12, the dynamic vibration absorber being characterized in that at least one of the multiple elastic members is formed from an MRE.

In this embodiment, the dynamic vibration absorber may be configured such that at least one of the multiple elastic members is made of the MRE and the remaining multiple elastic members are formed from the plate spring 28 made of a magnetic substance material, and the movable mass 46 forms the first closed magnetic path 42A together with the first electromagnet 22A and forms the second closed magnetic path 42B together with the second electromagnet 22B. In this case, the plate spring 28 may include the multiple cutout portions 28d that are arranged radially.

In this embodiment, the dynamic vibration absorber may be configured such that the first electromagnet 22A and the second electromagnet 22B are elastically-coupled to the multiple elastic members.

The vibration isolator 100 according to the embodiment is a characteristic value variable vibration isolator including: the second mounting member 30B that is coupled to the vibration isolator on a side thereof close to the vibration source 102; the first mounting member 30A that is coupled to the vibration isolator on a side thereof close to the vibration damping target member 12 vibrating with the vibration source 102; and the first elastic member 18A and the second elastic member 18B that elastically-couple the first mounting member 30A and the second mounting member 30B to each other, the vibration isolator being characterized in that the first elastic member 18A is made of an MRE having elastic characteristics variable with a magnetic field, and the second elastic member 18B is an elastic member different from the MRE.

In this embodiment, the vibration isolator may be configured such that the second elastic member 18B is formed from the plate spring 28 made of a magnetic substance material, a movable mass forms the closed magnetic path 42 together with the first elastic member 18A and the second elastic member 18B, and the vibration isolator varies the vibration characteristic value of the movable mass by controlling the magnetic field in accordance with the vibration of the vibration source. In this case, the plate spring 28 may include the multiple cutout portions 28d that are arranged radially.

In this embodiment, the vibration isolator may be configured such that it includes the electromagnet 22 capable of controlling the magnetic field, and the electromagnet 22 is elastically-coupled to both of the first elastic member 18A and the second elastic member 18B.

Note that the invention is not limited to the above embodiments, and can naturally take various configurations based on what is described in this specification. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

The invention claimed is:

1. A characteristic value variable dynamic vibration absorber comprising:
   a vibration damping target member that vibrates;
   a magneto-rheological elastomer as a first elastic member having an elastic characteristic variable corresponding to a magnetic field;
   a movable mass that is elastically-coupled to said vibration damping target member via the magneto-rheological elastomer, the dynamic vibration absorber varying a vibration characteristic value of said movable mass by controlling said magnetic field, wherein
   said dynamic vibration absorber further comprises a second elastic member different from said magneto-rheological elastomer, and
   said vibration damping target member and said movable mass are elastically-coupled to each other via said second elastic member,
   wherein said second elastic member is made by a plate spring made of a magnetic substance material.

2. The characteristic value variable dynamic vibration absorber according to claim 1, wherein
   said movable mass forms a closed magnetic path together with said first elastic member and said second elastic member, and
   said dynamic vibration absorber varies said vibration characteristic value of said movable mass by controlling said magnetic field in accordance with vibration of said vibration damping target member.

3. The characteristic value variable dynamic vibration absorber according to claim 2, wherein
   said plate spring includes a plurality of cutout portions that are arranged radially.

4. The characteristic value variable dynamic vibration absorber according to claim 1, further comprises an electromagnet that controls said magnetic field, and
   said electromagnet is elastically-coupled to both of said first elastic member and said second elastic member.

5. The characteristic value variable dynamic vibration absorber according to claim 4, wherein
   said movable mass forms a closed magnetic path together with said first elastic member, said second elastic member and the electromagnet, and said dynamic vibration absorber varies said vibration characteristic value of said movable mass by controlling said magnetic field in accordance with vibration of said vibration damping target member.

6. The characteristic value variable dynamic vibration absorber according to claim 1, wherein the first elastic member and the second elastic member extend parallel to each other.

* * * * *